United States Patent Office 3,736,338
Patented May 29, 1973

---

3,736,338
BENZODIOXOLE DERIVATIVES USEFUL AS PESTICIDES
Peter Stuart Gates, Cambridge, and John Gillon, Great Shelford, England, assignors to Fisons Limited, Suffolk, England
No Drawing. Continuation-in-part of application Ser. No. 706,628, Feb. 19, 1968. This application Apr. 1, 1971, Ser. No. 130,487
Claims priority, application Great Britain, Feb. 21, 1967, 8,174/67; Japan, Aug. 12, 1970, 45/70,147
Int. Cl. C07d *13/10*
U.S. Cl. 260—340.5     7 Claims

ABSTRACT OF THE DISCLOSURE

Substituted benzodioxoles of the formula:

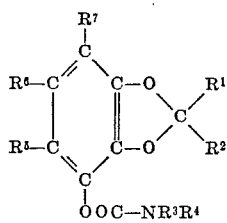

wherein $R^1$ and $R^2$ are hydorgen or alkyl of 1 to 6 carbon atoms or together with the linking carbon atom form a cycloalkane ring of 5 to 7 carbon atoms;
$R^3$ is hydrogen, alkyl of 1 to 4 carbon atoms or acetyl;
$R^4$ is alkyl of up to 4 carbon atoms, alkenyl of up to 4 carbon atoms, or alkynyl of up to 4 carbon atoms; and one of $R^5$, $R^6$ and $R^7$ is hydrogen, halogen or alkyl of 1 to 4 carbon atoms; and
the others of $R^5$, $R^6$ and $R^7$ each represents a hydrogen atom are valuable pesticides, particularly insecticides.

---

CROSS REFERENCE TO RELATED APPLICATION

This application is a continuation-in-part application of our copending application Ser. No. 706,628, filed Feb. 19, 1968, now abandoned.

The present invention relates to certain substituted benzodioxoles which have been found to possess pesticidal activity, to their preparation and to pesticidal compositions containing the same.

Accordingly the present invention is for the substituted benzodioxoles of the formula:

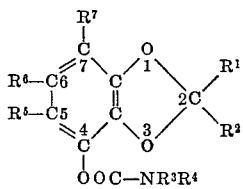

wherein $R^1$ and $R^2$ are selected from hydrogen and alkyl (for example of 1–6 carbon atoms, such as methyl, ethyl or butyl) substituted or unsubstituted, or $R^1$ and $R^2$ together with the linking carbon atom form a cycloalkane or cycloalkene ring of 5 to 7 carbon atoms, and wherein $R^3$ is selected from hydrogen, alkyl (for example of 1–4 carbon atoms, such as methyl or ethyl) substituted or unsubstituted and acyl (for example acetyl, propionyl or benzoyl) and where $R^4$ is selected from alkyl (for example of 1–4 carbon atoms such as methyl or ethyl) alkenyl (for example of 1–4 carbon atoms such as allyl) and alkynyl (for example of 1–4 carbon atoms such as propargyl) and $R^5$, $R^6$ and $R^7$ are selected from hydrogen, halogen (for example chlorine, bromine, iodine or fluorine) and alkyl (for example of 1–4 carbon atoms such as methyl or ethyl) substituted or unsubstituted.

According to a preferred embodiment of the invention $R^1$ and $R^2$ are selected from hydrogen and alkyl or together with the linking carbon atom form a cycloalkane ring of 5 or 6 carbon atoms, $R^3$ is selected from hydrogen, alkyl and acyl, $R^4$ is selected from alkyl, alkenyl and alkynyl, and $R^5$, $R^6$ and $R^7$ are selected from hydrogen and alkyl.

The present invention is also for pesticidal compositions which contain as an active ingredient a substituted benzodioxole as identified above. The pesticidal composition suitably also contains at least one material selected from the group comprising carriers, wetting agents, inert diluents and solvents.

The present invention is also for the treatment of plants, animals, the soil, materials or areas, which comprises applying thereon or thereto a substituted benzodioxole as identified above.

The present invention is also for the preparation of the substituted benzodioxoles as identified above which comprises reacting a 4-hydroxyl-1,3-benzodioxole with an isocyanate of the formula $R^4$NCO or a substituted carbamyl chloride of the formula $R^3R^4$NCOCl; in the case of substituted benzodioxoles where $R^3$ is acyl, these may be prepared by acylating the coresponding compound where $R^3$ is hydrogen. The substituted benzodioxoles may also be prepared by reacting a 1,3 - benzodioxolyl-4-chloroformate with an amine or amide of the formula $R^3R^4$NH. The groups $R^3$ and $R^4$ have the significance indicated above.

According to a preferred embodiment of the invention the substituted benzodioxole is a compound of the formula above where $R^5$, $R^6$ and $R^7$ are selected from hydrogen and alkyl, especially where $R^1$ and $R^2$ are methyl groups. Particularly preferred compounds are 2,2-dimethyl-1,3-benzodioxol-4-yl N-methylcarbamate and 2,2,7-trimethyl-1,3-benzodioxol-4-yl N-methylcarbamate.

A preferred group of compounds are of the formula above wherein:

$R^1$ and $R^2$ are selected from the group consisting of hydrogen and alkyl of 1 to 6 carbon atoms and a group where $R^1$ and $R^2$ together with the linking carbon atom form a cycloalkane ring of 5 to 7 carbon atoms;
$R^3$ is selected from the group consisting of hydrogen, alkyl of 1 to 4 carbon atoms and acetyl;
$R^4$ is selected from the group consisting of alkyl of up to 4 carbon atoms, alkenyl of up to 4 carbon atoms and alkynyl of up to 4 carbon atoms; and
One of $R^5$, $R^6$ and $R^7$ is selected from the group consisting of hydrogen, halogen and alkyl of 1 to 4 carbon atoms; and
The others of $R^5$, $R^6$ and $R^7$ each represents a hydrogen atom.

Preferably, $R^1$ and $R^2$ each represents a methyl group. Preferably also $R^3$ represents a hydrogen atom and $R^4$ represents a methyl group. In addition, $R^5$, $R^6$ and $R^7$ preferably each represents a hydrogen atom.

The substituted benzodioxoles are generally water insoluble and may be formulated in any of the ways commonly adopted for insoluble compounds.

If desired the substituted benzodioxoles may be dissolved in a water immiscible solvent, such as for example a high boiling hydrocarbon, suitably containing dissolved emulsifying agents so as to act as a self-emulsifiable oil on addition to water.

The substituted benzodioxoles may also be admixed with a wetting agent with or without an inert diluent to form a wettable powder which is soluble or dispersable in water, or may be mixed with the inert diluent to form a solid or powdery product.

Inert diluents with which the substituted benzodioxoles may be incorporated include solid inert media comprising powdered or divided solid materials, for example, clays, sands, talc, mica, fertilizers and the like, such products either comprising dust or larger particle size materials.

The wetting agents used may comprise anionic compounds such as for example soaps, fatty sulphate esters such as dodecyl sodium sulphate, octadecyl sodium sulphate and cetyl sodium sulphate, fatty aromatic sulphonates such as alkylbenzene sulphonates or butyl naphthalene sulphonate, more complex fatty sulphonates such as the amide condensation products of oleic acid and N-methyl taurine or the sodium sulphonate of dioctyl succinate.

The wetting agents may also comprise non-ionic wetting agents such as for example condensation products of fatty acids, fatty alcohols or fatty substituted phenols with ethylene oxide, or fatty esters and ethers of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

The pesticidal composition may also be in the form of an aerosol composition, suitably using a cosolvent and a wetting agent, in addition to the propellant, which is suitably a polyhalogenated alkane such as dichlorodifluoromethane.

The pesticidal compositions according to the present invention may contain in addition to the substituted benzodioxoles other active insecticides, bactericides and fungicides. It has been found that particular advantages are obtained with mixtures with other insecticides.

In their various applications the compounds of the invention may be used at various rates; thus for example for the treatment of plants for the control of pests on plants the compounds are suitably applied at a rate of about 0.25–16 ounces per acre (17–1120 g. per hectare) and preferably 0.5–4 ounces per acre (35–280 g. per hectare); for the treatment of animals for the control of ticks, the animal is suitably dipped in or sprayed with a solution containing 30–300 parts per million of the active compound.

The following examples are given to illustrate the present invention. The parts and percentages are by weight unless otherwise indicated.

EXAMPLE 1

2,2-dimethyl-4-hydroxy-1,3-benzodioxole (14 parts) in benzene (25 parts) was treated with methyl isocyanate (6 parts) and a few drops of triethylamine with cooling. After standing for 30 minutes, the crystals of 2,2-dimethyl-1,3-benzodioxol-4-yl N-methylcarbamate which formed were filtered off and washed with benzene then with petroleum (boiling point below 40° C.) to yield the pure compound as a white solid, melting point 129–130° C. (16 parts, 85% yield).

*Analysis.*—Found (percent): C, 59.35; H, 5.90; N, 6.35. $C_{11}H_{13}NO_4$ requires (percent): C, 59.18; H, 5.87; N, 6.28.

EXAMPLES 2–11

The process of Example 1 was repeated replacing the 2,2-dimethyl - 4 - hydroxyl-1,3-benzodioxole by the appropriate substituted hydroxy-1,3-benzodioxole to form the following compounds:

2-ethyl-2-methyl-1,3-benzodioxol-4-yl N-methylcarbamate, melting point 86–87° C.
2,2-tetramethylene-1,3-benzodioxol-4-yl N-methylcarbamate, melting point 123–124° C.
2,2-pentamethylene-1,3-benzodioxol-4-yl N-methylcarbamate, melting point 90–91° C.
2-tert-butyl-2-methyl-1,3-benzodioxol-4-yl N-methylcarbamate, melting point 89–90° C.
2,2,7-trimethyl-1,3-benzodioxol-4-yl N-methylcarbamate, melting point 146–147° C.
2,2,6-trimethyl-1,3-benzodioxol-4-yl N-methylcarbamate, melting point 136–138° C.
2-methyl-1,3-benzodioxol-4-yl N-methylcarbamate, melting point 135–137° C.
1,3-benzodioxol-4-yl N-methylcarbamate, melting point 146–148° C.
7-chloro-2,2-dimethyl-1,3-benzodioxol-4-yl N-methylcarbamate, melting point 147–148° C.
7-ethyl-2,2-dimethyl-1,3-benzodioxol-4-yl N-methylcarbamate, melting point 113–115° C.

EXAMPLES 12–14

A stirred solution of 50 parts of phosgene in 200 parts of benzene was treated over one hour with a solution of 4-hydroxy-2,2-dimethyl-1,3-benzodioxole (33 parts) and dimethylaniline (24 parts) in benzene (150 parts) and stirred for a further 2 hours. The solution was then filtered, washed with water, dried and the 2,2-dimethyl-3-benzodioxole-4-yl chloroformate (41 parts, boiling point 83–84° C./0.5 mm.) distilled off.

To a cold stirred solution of sodium carbonate (9.5 parts) and propargylamine hydrochloride (8.2 parts) in water (50 parts) and ether (40 parts) was added a solution of the chloroformate (16 parts) in ether (40 parts). After stirring for one hour, the ethereal solution was washed, dried and evaporated to give 14.9 parts of 2,2-dimethyl-1,3-benzodioxol - 4 - yl N-propargylcarbamate, melting point 107–109° C.

In a similar way by reacting the chloroformate with allylamine and dimethylamine respectively, the following compounds were prepared:

2,2-dimethyl-1,3-benzodioxol-4-yl N-allylcarbamate, melting point 93–95° C.
2,2-dimethyl-1,3-benzodioxol-4-yl N,N-dimethylcarbamate, boiling point 119–122° C. at 0.5 mm. Hg pressure.

EXAMPLE 15

Example A

A solution of pyrogallol (50 parts) in ethyl methyl ketone (200 parts) was stirred and heated to 50°, then phosphorus pentoxide was added portionwise at such a rate that the temperature remained about 80°. After stirring for a further 30 minutes at about 50° the liquid layer was poured into cold water (1,000 parts) and the crude product isolated by extraction with benzene and evaporating the extracts. Distillation of the crude product gave pure 4-hydroxy-2-ethyl-2-methyl-1,3-benzodioxole (39.5 parts), boiling point 84–85°/0.4 mm., melting point 48–50° C.

Example B

A solution of pyrogallol (63 parts) in 2,2-dimethoxypropane (100 parts) and benzene (100 parts) containing toluenesulfonic acid (0.01 parts) was slowly distilled through a fractionating column during 4 hours, removing liquid (150 parts), boiling point 57–64°. A few drops of triethylamine were then added and the mixture thoroughly washed with water, dried and evaporated. Distillation gave 4-hydroxy-2,2-dimethyl-1,3-benzodioxole (36 parts), boiling point 110°/0.7 mm., which was purified by recrystallisation from carbon tetrachloride. Melting point 88–90° C.

EXAMPLES 16–19

In a similar way to Example 15 the following compounds were prepared:

4-hydroxy-2,2-diethyl-1,3-benzodioxole, melting point 56–58° C.
4-hydroxy-2,2-pentamethylene-1,3-benzodioxole, boiling point 130–134° at 0.3 mm. Hg pressure.

4-hydroxy-2,2-tetramethylene-1,3-benzodioxole, melting point 59–62° C.

4-hydroxy-2-tertiarybutyl-2-methyl-1,3-benzodioxole, melting point 79–81° C.

EXAMPLE 20

2,2-dimethyl-1,3-benzodioxol-4-yl N - methylcarbamate (prepared as in Example 1) (8 parts) was refluxed for 15 minutes in acetic anhydride (40 parts) with a few drops of concentrated sulphuric acid. Sodium acetate (1 part) as added and most of the acetic anhydride was distilled off under vacuum. The remaining oil was poured into water (200 parts) and after standing for 1 hour was extracted into ether three times. The ether solution was washed with aqueous sodium bicarbonate solution and with water, then dried over sodium sulphate. The ether was distilled off under reduced pressure to yield 2,2-dimethyl - 1,3 - benzodioxol - 4 - yl N-acetyl-N-methylcarbamate, which was recrystallized from petroleum as a yellow crystalline solid, melting point 76–77° C. (5.5 parts, 58% yield).

*Analysis.*—Found (percent): C, 59.10; H, 5.90; N, 5.05. $C_{13}H_{15}NO_5$ requires (percent): C, 58.86; H, 5.70; N, 5.28.

EXAMPLES 21–22

The process of Example 20 was repeated replacing the carbamate starting material successively by 2,2-dimethyl-1,3-benzodioxol-4-yl N-propargyl carbamate and 2-ethyl-2-methyl-1,3-benzodioxol-4-yl N-methylcarbamate giving 2,2-dimethyl-1,3-benzodioxol-4-yl N - acetyl-N-propargyl carbamate, boiling point 138–140° C./0.5 mm. Hg pressure and 2-ethyl-2-methyl-1,3-benzodioxol-4-yl N-acetyl-N-methylcarbamate, boiling point 124–126° C./0.4 mm. Hg pressure.

EXAMPLES 23–25

9 centimetre diameter filter papers treated with aqueous acetone solutions of each of the compounds 2,2-dimethyl-1,3-benzodioxol-4-yl N-methylcarbamate, 2,2-dimethyl-1,3-benzodioxol-4-yl N-acetyl-N-methylcarbamate and 1,3-benzodioxol-4-yl N-methylcarbamate at rates equivalent to 100 milligrams per square foot (100 mgm./0.09 m.²) of the active ingredient were placed in 9 centimetre diameter petri dishes. Batches of adult female houseflies (*Musca domestica*) lightly anaesthetised with carbon dioxide were then introduced into the dishes and a glass lid placed over each. After 24 hours the flies were examined and were all found to be dead.

EXAMPLES 26–33

7 centimetre diameter circular discs of cabbage leaves were painted with 1 millilitre aqueous acetone solutions of each of the following compounds:

2,2-dimethyl-1,3-benzodioxol-4-yl N-methylcarbamate,
2,2-dimethyl-1,3-benzodioxol-4-yl N-acetyl-N-methylcarbamate,
2,2,7-trimethyl-1,3-benzodioxol-4-yl N-methylcarbamate,
2,2-dimethyl-1,3-benzodioxol-4-yl N-allylcarbamate,
2,2-dimethyl-1,3-benzodioxol-4-yl N-propargylcarbamate,
2,2-dimethyl-1,3-benzodioxol-4-yl N-acetyl-N-propargylcarbamate,
2-ethyl-2-methyl-1,3-benzodioxol-4-yl N-methylcarbamate and
2,2-tetramethylene-1,3-benzodioxol-4-yl N-methylcarbamate, in each case at concentrations equivalent to leaf applications of 10, 5, 1, 0.5 and 0.25 pounds per acre (11.2, 5.6, 1.12, 0.56 and 0.28 kg./hectare) of active ingredient. When the deposit on the leaf discs had dried, each leaf disc was placed in a 9 centimetre diameter petri dish, infested with ten second instar larvae of the cabbage white butterfly (*Pieris brassicae*) and covered with a glass lid. Three replications were made with each compound at each concentration level. After 48 hours the larvae were examined and were all found to be dead.

EXAMPLES 34–35

Aqueous suspensions containing 100 parts per million of 2,2-dimethyl-1,3-benzodioxol-4-yl N-methylcarbamate and 2,2-dimethyl-1,3-benzodioxol-4-yl N-acetyl-N-methylcarbamate were sprayed at a rate equivalent to 50 gallons per acre 585 litres per hectare on young field beans (*Vicia faba*) infested with adult apterous vetch aphids (*Megoura viciae*). After treatment the plants were enclosed in glass cages with gauze tops for ventilation. Each treatment produced complete kill of the aphids in 24 hours as compared with no kill on control plants.

EXAMPLE 36

A wettable powder formulation was made by micronising the following:

|  | Percent |
|---|---|
| 2,2-dimethyl-1,3-benzoxazol-4-yl N-methylcarbamate | 25 |
| Hoe S1/263 (sodium salt of sulphonated condensation product of a long chain alcohol with ethylene oxide) | 3 |
| China clay | 72 |

This was suitable for dispersion in water and spraying on plants.

EXAMPLE 37

A 5% granular formulation was made up as follows: Limestone grit and 2% Carbowax were tumbled for 30 minutes. 5% finely ground 2,2-dimethyl-1,3-benzodioxol-4-yl N-methylcarbamate was then added and tumbled for 15 minutes. 1.25% of Calfo E (a proprietary calcium silicate) was then added and tumbled for a further 75 minutes to prevent sticking of the granules. The granules were finally sieved through a 12-mesh sieve.

EXAMPLES 38–45

Cylindrical pads of cotton wool, approximate diameter 1 cm., length 2 cms. were treated with ½ ml. of acetone solutions of the following carbamates:

2,2-dimethyl-1,3-benzodioxol-4-yl N-methylcarbamate,
2-methyl-1,3-benzodioxol-4-yl N-methylcarbamate,
2,2,7-trimethyl-1,3-benzodioxol-4-yl N-methylcarbamate,
2,2,6-trimethyl-1,3-benzodioxol-4-yl N-methylcarbamate,
2-ethyl-2-methyl-1,3-benzodioxol-4-yl N-methylcarbamate,
2,2-diethyl-1,3-benzodioxol-4-yl N-methylcarbamate,
2-tert-butyl-2-methyl-1,3-benzodioxol-4-yl N-methylcarbamate,
7-ethyl-2,2-dimethyl-1,3-benzodioxol-4-yl N-methylcarbamate.

After leaving for 12 hours to dry, the pads were treated with 1 ml. of sheep blood serum and infested with 20 first instar larvae of the sheep blowfly (*Lucilia sericata*). After 24 hours, the blowflies were examined and found to be all dead; insects similarly infested on untreated pads were unaffected.

EXAMPLES 46–47

Filter papers, diameter 9 cm., were treated with 1 ml. of acetone solutions containing 30 parts per million of 2,2-dimethyl-1,3-benzodiox 1-4-yl N-methylcarbamate or 7-chloro-2,2-dimethyl-1,3-benzodioxal-4-yl N-methylcarbamate. When they had dried, they were folded into quadrant shaped packets, infested with 20 first stage larvae of the cattle tick, *Boophilus microplus,* closed with a metal clip and kept at 25° C. for 24 hours. At the end of this period it was found that all the ticks in the treated filter papers were dead, compared with fewer than 5% of those in control experiments.

The intermediate hydroxy benzodioxoles of the formula:

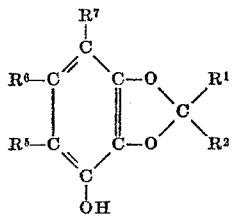

wherein $R^1$, $R^2$, $R^5$, $R^6$ and $R^7$ are as defined above, excluding the cases where $R^1$ and $R^2$ are hydrogen or methyl when $R^5$, $R^6$ and $R^7$ are all hydrogen, are new compounds and are embraced within the present invention. These compounds are suitably prepared from 1,2,3-trihydroxybenzene (pyrogallol) by reaction with the appropriate ketone in the presence of phosphorus pentoxide using the ketone as solvent.

We claim:
1. A compound of the formula;

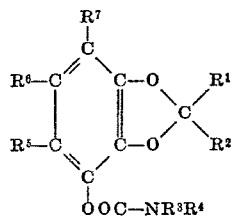

wherein $R^1$ and $R^2$ are selected from the group consisting of hydrogen and alkyl of 1 to 6 carbon atoms and a group where $R^1$ and $R^2$ together with the linking carbon atom form a cycloalkane ring of 5 to 7 carbon atoms;

$R^3$ is selected from the group consisting of hydrogen, alkyl of 1 to 4 carbon atoms and acetyl;

$R^4$ is selected from the group consisting of alkyl of up to 4 carbon atoms, alkenyl of up to 4 carbon atoms, and alkynyl of up to 4 carbon atoms; and one of $R^5$, $R^6$ and $R^7$ is selected from the group consisting of hydrogen, halogen, and alkyl of 1 to 4 carbon atoms; and the others of $R^5$, $R^6$ and $R^7$ each represents a hydrogen atom.

2. A compound as claimed in claim 1 wherein one of $R^5$, $R^6$ and $R^7$ is selected from the group consisting of hydrogen and alkyl of 1 to 4 carbon atoms and the other members of $R^5$, $R^6$ and $R^7$ each represents a hydrogen atom.

3. A compound as claimed in claim 1 wherein $R^1$ and $R^2$ each represents a methyl group.

4. A compound as claimed in claim 1 wherein $R^3$ represents a hydrogen atom and $R^4$ represents a methyl group.

5. A compound as claimed in claim 1 wherein $R^5$, $R^6$ and $R^7$ each represents a hydrogen atom.

6. 2,2-dimethyl-1,3-benzodioxol-4-yl N-methylcarbamate.

7. 2,2,7-trimethyl-1,3-benzodioxol-4-yl N-methylcarbamate.

No references cited.

ALEX MAZEL, Primary Examiner

J. H. TURNIPSEED, Assistant Examiner

U.S. Cl. X.R.

424—282